United States Patent [19]

Koiwai et al.

[11] Patent Number: 5,748,390

[45] Date of Patent: May 5, 1998

[54] IMAGING LENS SYSTEM

[75] Inventors: Tamotsu Koiwai, Akiruno; Sumio Kawai, Hachioji; Tatsuo Kitazawa, Hino; Hisashi Goto, Yokohama, all of Japan

[73] Assignee: Olympus Optical Co., Ltd., Tokyo, Japan

[21] Appl. No.: 786,201

[22] Filed: Jan. 21, 1997

[30] Foreign Application Priority Data

Jan. 24, 1996 [JP] Japan ..................... 8-010311

[51] Int. Cl.$^6$ ..................................... G02B 7/02
[52] U.S. Cl. ..................... 359/811; 359/819; 359/823
[58] Field of Search ..................... 359/811, 813, 359/819, 820, 822, 823, 694

[56] References Cited

U.S. PATENT DOCUMENTS

| | | | |
|---|---|---|---|
| 3,205,774 | 9/1965 | Estes | 359/820 |
| 4,787,720 | 11/1988 | Fukita et al. | 359/823 |
| 5,150,260 | 9/1992 | Chigira | 359/694 |
| 5,161,061 | 11/1992 | Ihara et al. | 359/811 |
| 5,249,082 | 9/1993 | Newman | 359/813 |
| 5,461,444 | 10/1995 | Okura et al. | 359/819 |
| 5,642,235 | 6/1997 | Ichikawa | 359/811 |
| 5,680,260 | 10/1997 | Farcella et al. | 359/819 |

FOREIGN PATENT DOCUMENTS

| | | |
|---|---|---|
| 57-49929 | 3/1982 | Japan . |
| 5-11116 | 12/1993 | Japan . |
| 7-005353 | 1/1995 | Japan . |

*Primary Examiner*—Loha Ben
*Attorney, Agent, or Firm*—Louis Weinstein

[57] ABSTRACT

An imaging lens system comprises an axial support section, such as a support hole, a notch, and a guide sleeve, integrally formed with a lens and arranged generally within the maximum diameter of the lens but outside an effective area of the lens through which an imaging light is transmitted. The imaging lens system also comprises a guide shaft that slidably supports the axial support section for a advancing and recessing motion of the lens. The area outside the imaging light transmitting area is effectively used. A small component count, compact and low-cost design is implemented in the imaging lens system.

18 Claims, 6 Drawing Sheets

IMAGING LENS SYSTEM

BACKGROUND OF THE INVENTION

1. Field of the Invention

The present invention relates to an imaging lens system.

2. Related Art Statement

Several proposals have been made in connection with an optical system having a lens configuration with its unused portion cut away. The unused portion is a part of lens that transmits no effective light. For instance, Japanese Unexamined Patent Publication No. 57-49929 discloses a photometering device in which a unused light passage portion is removed from the light receiving lens in a photometric optical system to reduce occupied space.

Japanese Unexamined Patent Publication No. 57-49929 is mainly aimed at reducing space, and discloses nothing about the effective use of the space made available.

Japanese Unexamined Patent Publication No. 7-5353 discloses a lens support structure which employs an oval lens, a pair of end faces of which are supported by a lens clamp. Furthermore, Japanese Unexamined Utility Model Publication No. 5-11116 discloses a lens barrel in which a compact design is implemented by cutting away the top and bottom arc portions of a first group lens in an optical system and mounting an auxiliary optical unit in the cutout portion.

Both Japanese Unexamined Patent Publication No. 7-5353 and Japanese Unexamined Utility Model Publication No. 5-11116 utilize the cutout portions of the lenses as a frame, not aiming at component count reduction and space saving.

OBJECT AND SUMMARY OF THE INVENTION

Accordingly, it is an object of the present invention to provide an imaging lens system that makes use of the area outside the effective area of an optical lens transmitting an imaging light and aims at reducing the component count of the system and implementing a compact and low-cost design in an imaging lens system.

The imaging lens system of the present invention comprises a support for supporting the optical lens, which is integrally formed with the optical lens in a manner that the support is arranged generally within the outer diameter area of the optical lens but outside the effective area of the optical lens that transmits an imaging light flux.

According to the imaging lens system of a camera, the support is integrally or semi-integrally formed with the optical lens in an unused space, namely the area of a widely available, conventional, circular lens that serves conventionally no transmission purpose of an imaging light flux. Thus, space is efficiently used, a compact design is implemented, the component count required for supporting the optical lens is reduced, and a low-cost imaging system results.

BRIEF OF DESCRIPTION OF THE DRAWINGS

DETAILED DESCRIPTION OF THE PREFERRED EMBODIMENT

Figure 1:
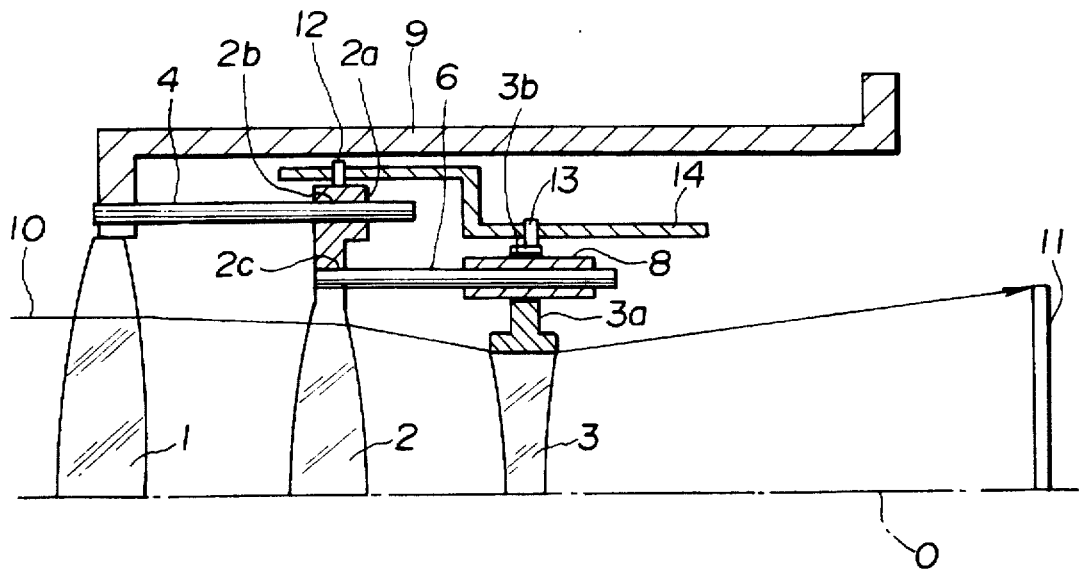
FIG. 1 is a vertical sectional view of a lens barrel in which a camera imaging lens system of a first embodiment of the present invention is incorporated.

Referring now to the drawings, the embodiments of the present invention are discussed.

Figure 2:
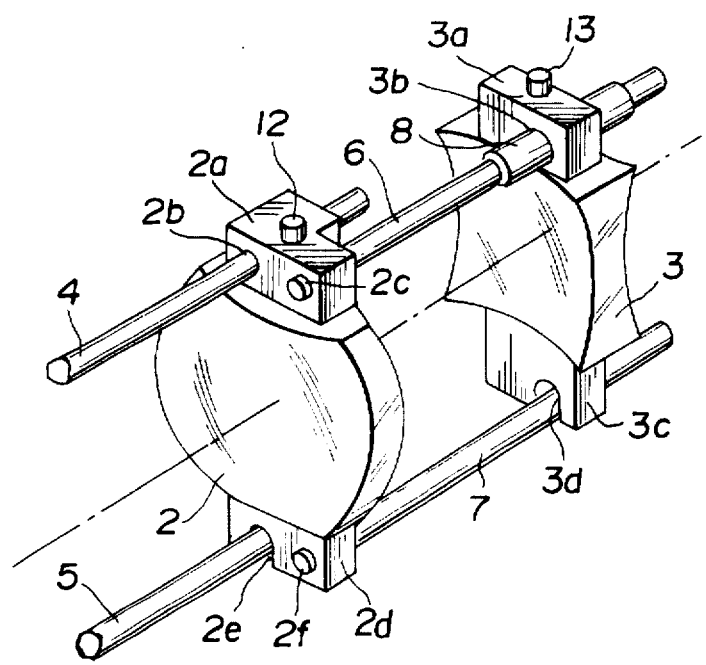
FIG. 2 is a perspective view of a major portion of the lens barrel in FIG. 1.
Figure 3:
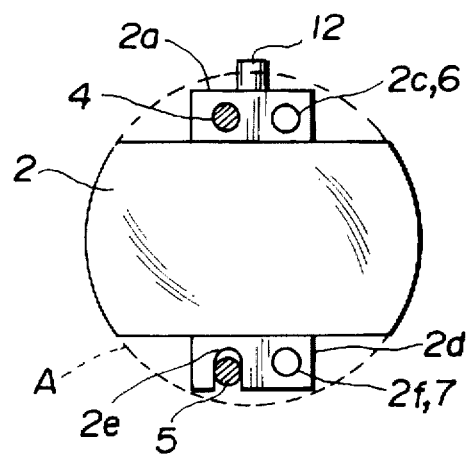
FIG. 3 is a front view of a second lens of the lens barrel in FIG. 1.
Figure 4:
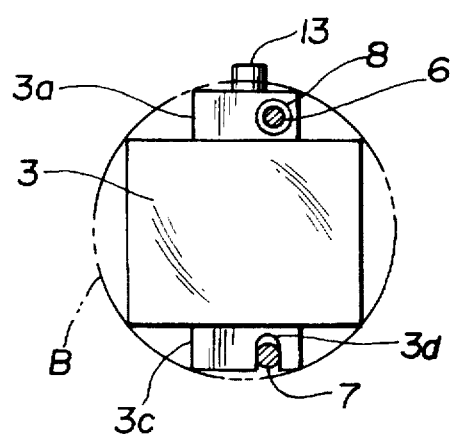
FIG. 4 is a front view of a third lens of the lens barrel in FIG. 1.

FIG. 1 is a vertical sectional view of the lens barrel in which the camera imaging lens system of a first embodiment of the present invention is incorporated. FIG. 2 is a perspective view of the major portion of the lens barrel in FIG. 1. FIGS. 3 and 4 are front views of the second and third lenses, respectively.

In this lens barrel, a first lens 1 of a circular shape is rigidly attached to a fixed frame 9 secured to an unshown camera body. Rigidly attached to the fixed frame 9 are a first shaft 4 and a second shaft 5, as support members, both of which are extended backward for a supporting purpose.

The first and second shafts 4, 5 slidably support a generally oval shaped second lens 2 with the top and bottom portions of its originally circular shape removed, in a manner that allows the second lens 2 to move back and forth in the direction of an optical axis O. As for the support structure of the second lens 2, a first support 2a of the second lens 2 is provided with a supporting hole 2b as an engagement section having a support function, and the first shaft 4 is slidably supported at the supporting hole 2b. A second support 2d of the second lens 2 is provided with a supporting notch 2e as an engagement section having a support function, and the second shaft 5 is slidably engaged with the supporting notch 2e in a manner that allows the shaft 5 to slide in its longitudinal direction and in a radial direction of the lens 2.

A third shaft 6 and a fourth shaft 7 as support sections having a support function are bonded or fixed, by insert molding a resin lens member, to axial support sections 2c and 2f of the respective first and second supports 2a, 2d of the second lens 2.

The second lens 2 is a molded resin lens. The first support 2a and the second support 2d of the second lens 2 that are integrally formed with the lens section of the second lens 2 are arranged, in an area of the second lens 2 that does not transmit an imaging light flux 10 forming an image on a film plane 11, but generally within the outer diameter area of the second lens 2. Specifically, the first support 2a and the second support 2d are arranged within a phantom circle A in which the second lens 2 is inscribed as shown in FIG. 3.

The third shaft 6 and the fourth shaft 7 support a square third lens 3 with the top, bottom, left and right arc portions removed, in a manner that allows the third lens 3 to move back and forth in the direction of the optical axis O. As for the support structure of the third lens 3, a first support 3a of the third lens 3 is provided with a supporting hole 3b, and a sleeve 8 as an engagement section having a support function is rigidly fixed at the supporting hole 3b. The third shaft 6 is slidably supported at its rearward position by the sleeve 8. A second support 3c of the third lens 3 is provided with a receiving notch 3d as an engagement section having a support function, and the fourth shaft 7 is slidably engaged with the receiving notch 3d in a manner that allows the shaft 7 to slide in its longitudinal direction and in a radial direction of the lens 3.

The third lens 3 is a molded resin lens. The first support 3a and the second support 3c of the third lens 3 that are integrally formed with the lens section of the third lens 3 are arranged, in an area of the third lens 3 that does not transmit an imaging light flux 10, but generally within the outer diameter area of the third lens. Specifically, the first support 3a and the second support 3c are arranged within a phantom circle B in which the third lens 3 is inscribed as shown in FIG. 4.

The sleeve 8 is bonded to the supporting hole 3b of the first support 3a having a slightly larger diameter than the sleeve 8 with the relative position of the second lens 2 to the third lens 3 kept to a predetermined accuracy. In this way, both lenses 2 and 3 are assembled at a sufficiently high accuracy without the need for particularly high accuracy in the machining of the outer diameter of the sleeve 8 and the supporting hole 3b and the assembling of these components.

Cam followers 12, 13 are attached to the first supports 2a, 3a of the respective second and third lenses, and are received in respective cam grooves in a cam ring 14.

The lens advancing and receding motion in the lens barrel thus constructed is now discussed. The second lens 2 is positioned along the optical axis by means of the first shaft 4 and the second shaft 5, and is moved as desired in the direction of the optical axis along with the relative rotation of the cam follower 12 to the cam ring 14.

In a similar fashion, the third lens 3 is positioned along the optical axis by means of the third shaft 6 and the fourth shaft 7, and is moved as desired in the direction of the optical axis along with the relative rotation of the cam follower 13 to the cam ring 14.

In the lens barrel of this embodiment, the supports that are integrally formed with the lenses are arranged in conventionally unused portions that serves no transmission purpose of the imaging light flux in the conventional circular lenses. Thus, space is efficiently used, a compact design is implemented, the component count required for supporting the optical lens is reduced, and a low-cost imaging system results.

With its position and alignment to the lens accurately adjusted, the sleeve working as a shaft and a support is rigidly attached to the lens. Thus, this embodiment offers a high optical axis alignment accuracy between lenses, compared with systems in which a shaft and a lens are integrally formed. In such an embodiment as this imaging lens system where a plurality of lens groups are employed, the advantage of the present invention is even more noticeable if the principle of the present invention is incorporated into a lens group to the side of the film.

The camera imaging lens system according to the second embodiment of the present invention is now discussed.

Figure 5:
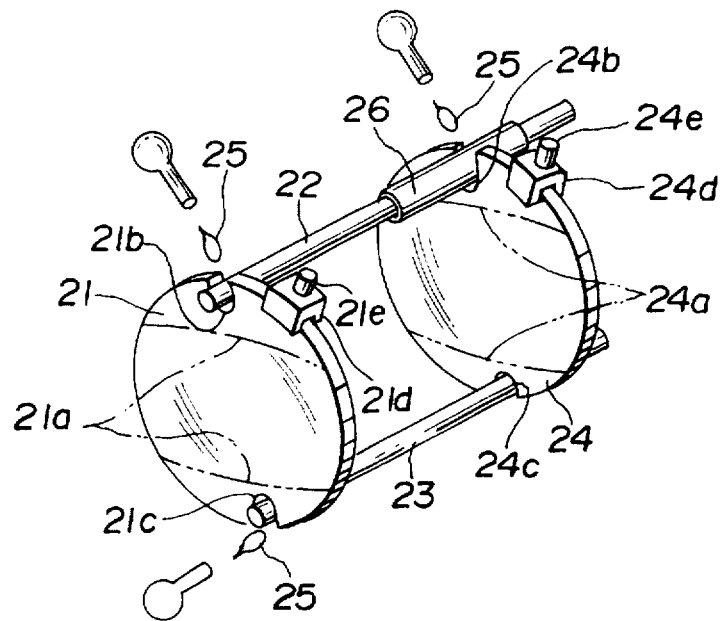
FIG. 5 is a perspective view of a major portion of a camera imaging lens system according to a second embodiment of the present invention.
Figure 6:
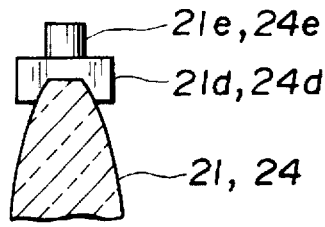
FIG. 6 is a fragmentary cross-sectional view of a cam follower in the imaging lens system in FIG. 5.

FIG. 5 is a perspective view of the major portion of the camera imaging lens system according to a second embodiment of the present invention. FIG. 6 is a fragmentary cross-sectional view of the cam follower rigidly connected to the first or second lens.

A first lens 21 and a second lens 24 constituting the imaging lens system are made of glass. The first lens 21 has both a first notch 21b and a second notch 21c outside the effective area 21a of the first lens 21 that transmits an imaging light but within the outer diameter area of the lens. A first shaft 22 and a second shaft 23 as support members having a support function are attached to the first and second notches 21b and 21c, respectively, with an adhesive 25, in a manner that both shafts 22 and 23 run in parallel with the optical axis.

The second lens 24 is arranged behind the first lens 21. The second lens 24 has both a first notch 24b and a second notch 24c outside the effective area 24a of the second lens 24 that transmits the imaging light but within the outer diameter area of the lens. A sleeve 26 as an engagement member having a support function is rigidly bonded into the first notch 24b with the adhesive 25. The sleeve 26 slidably supports the first shaft 22. The bonding operation of the sleeve 26 is performed while its parallelism is kept to the optical axis O using a tool. The second notch 24c slidably receives the second shaft 23.

The first and second notches 21b, 21c of the first lens 21 and the first and second notches 24b, 24c of the second lens 24 are formed during a glass press process prior to a lens polishing process, or formed during a succeeding cutting process.

Figure 7:
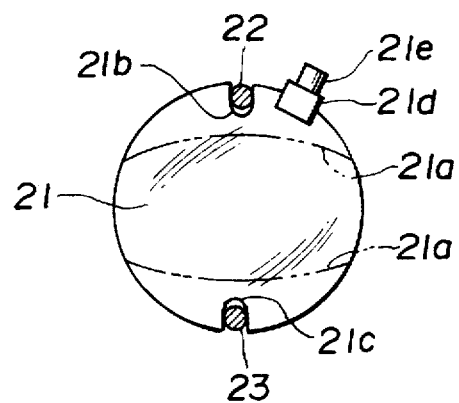
FIG. 7 is a front view of a first lens in the imaging lens system in FIG. 5.
Figure 8:
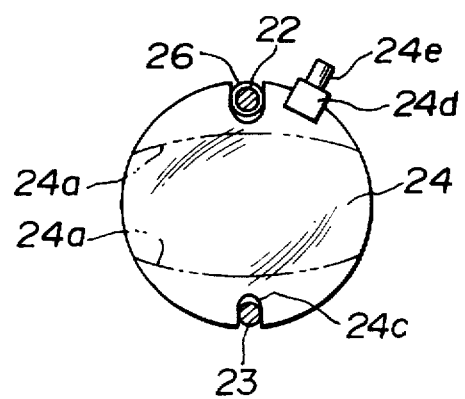
FIG. 8 is a front view of a second lens in the imaging lens system in FIG. 5.

FIGS. 7 and 8 show the engaged states of the first lens 21 and second lens 24, respectively. As shown, cam followers 21e, 24e of synthetic resin, along with their respective bases 21d, 24d, are bonded to the respective peripheral portions outside the effective areas 21a, 24a of the first and second lens 21, 24, respectively. FIG. 6 is a fragmentary cross-sectional view of the cam followers 21e, 24e and their associated components.

Discussed next is the lens advancing and receding operation of the imaging lens system of the camera thus constructed. The second lens 24 that is slidably supported by the first shaft 22 and second shaft 23, both rigidly attached to the first lens 21, is moved in the direction of the optical axis by unshown cam means. The position of the second lens 24 relative to the first lens 21 is set by the aligned sleeve 26 and the notch 24c along the first and second shafts 22, 23.

Conventional glass lenses are typically secured to a lens frame, and the lens frame is moved in the direction of an optical axis for lens driving. According to the imaging lens system of this embodiment, however, the support section is integrally formed with the lens, taking advantage of the space not serving the transmission purpose of an imaging light. As a result, a small component count, compact and low-cost design is implemented in the imaging lens system. With its alignment and position kept to a required accuracy, the sleeve 26 for axial supporting is bonded to the second lens, thereby maintaining the accuracy of the imaging lens system to a high level.

Discussed next is a camera imaging lens system according to a third embodiment of the present invention.

Figure 9:
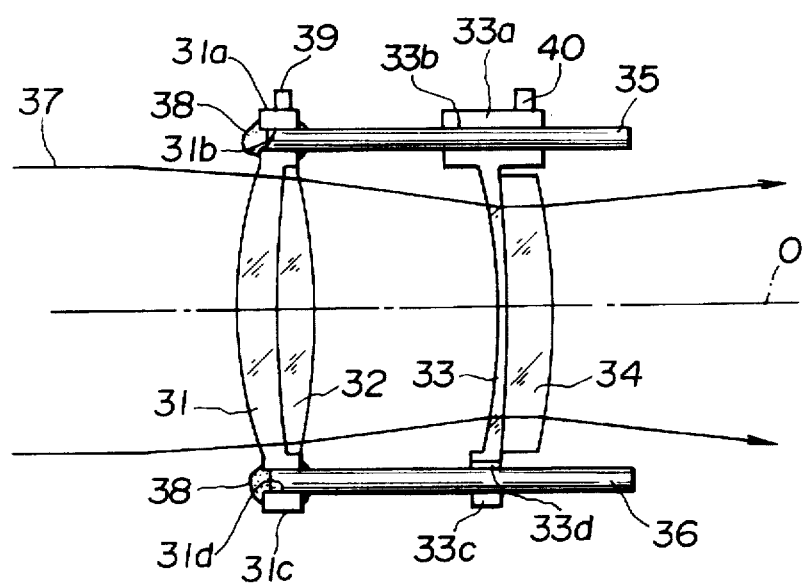
FIG. 9 is a vertical sectional view of a major portion of a camera imaging lens system according to a third embodiment of the present invention.

FIG. 9 is a sectional view of the camera imaging lens system according to the third embodiment of the present invention. The imaging lens system is constructed of two lens groups, first group lenses and second group lenses.

Figure 10:
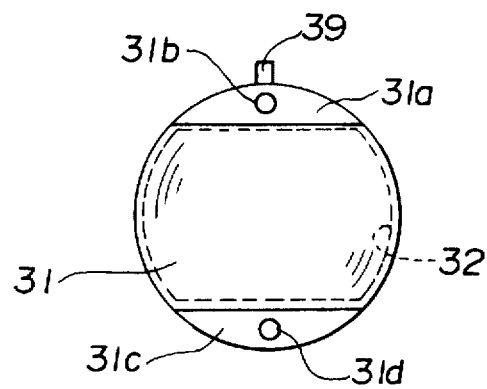
FIG. 10 is a front view showing a first group lens in the imaging lens system in FIG. 9.

Shown in FIG. 9 are a first lens 31 and a second lens 32, both constituting the first group lenses. The first lens 31 is constructed of a molded resin while the second lens 32 is of glass. In the course of its molding process, the first lens 31 is positioned and then rigidly bonded to the second lens 32. As shown in a front view in FIG. 10, the second lens 32 of glass has an oval shape that covers an effective area corresponding to the image plane of a rectangular film frame, namely an area that transmits an effective light flux. One of the candidate materials for the first lens 31 may be a thermoplastic resin or an ultraviolet-curing resin.

A first support 31a is arranged within the area that is not used for transmitting an imaging light flux 37 and lies within the outer diameter area of the first lens 31. The first support 31a is provided with a support hole 31b into which a first shaft 35 as a support member having support function is rigidly bonded. Furthermore, a cam follower 39 which is engaged with an unshown cam groove is attached to the first support 31a. Disposed diagonally opposite from the first support 31a across the optical axis on the first lens 31 is a second support 31c, which is provided with a support hole 31d. A second shaft 36 as a support member having support function is rigidly secured in the support hole 31d.

Figure 11:
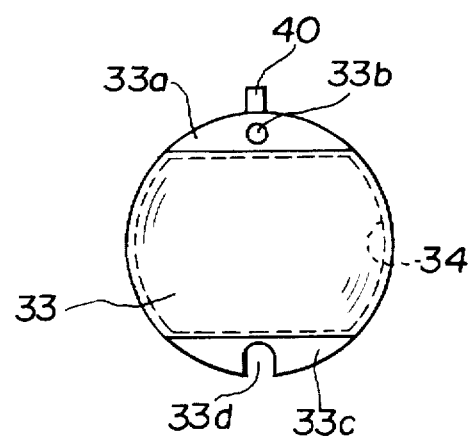
FIG. 11 is a front view showing a second group lens in the imaging lens system in FIG. 9.

Also shown are a third lens 33 and a fourth lens 34, both constituting the second group lenses. The third lens 33 is constructed of a molded resin and the fourth lens 34 is of glass. In the course of its molding process, the third lens 33 is rigidly bonded to the fourth lens 34 of glass. As shown in a front view in FIG. 11, the fourth lens 34 of glass has an oval shape that covers an effective area corresponding to the image plane of a rectangular film frame, namely an area that transmits an effective light flux 37. One of the candidate materials for the second lens 33 may be a thermoplastic resin or an ultraviolet-curing resin.

A first support 33a and a second support 33c are formed within the area that is not used for transmitting the imaging light flux 37 and lie within the outer diameter area of the third lens 33. The first and second supports 33a, 33c are provided with support holes 33b, 33d, as engagement sections having support function, respectively. A cam follower 40 engaged with an unshown cam groove is attached to the first support 33a.

Discussed next is the lens advancing and receding operation of the imaging lens system of the camera thus constructed. The first shaft 35 and second shaft 36 attached to the first lens 31 are positioned in relation to the optical axis. The first lens 31 and the third lens 33 can be relatively moved with their optical axes aligned, because of the support hole 33b receiving the first shaft 35 and the support hole 33d receiving the second shaft 36. This means that the second lens 32 joined to the first lens 31 and the fourth lens 34 joined to the third lens 33 can also be relatively moved with their optical axes aligned.

With the unshown cam grooves engaging with the cam followers 39, 40 attached to the first lens 31 and third lens 33, the first lens 31, second lens 32, third lens 33, and fourth lens 44 are moved by a desired travel on the optical axis O.

In the camera imaging lens system of this embodiment, the resin-molded lenses also work as the frames of the respective glass lenses, and the supports are formed within the space that is not used for transmitting the imaging light. Thus, a small component count, compact and low-cost design is implemented in the imaging lens system Since the shafts are positioned to a desired accuracy level and then bonded to the lenses, the mounting accuracy of the system is substantially increased compared with a lens system in which the frames of the lens are formed of molded resin lens only.

What is claimed is:

1. An imaging lens system for a camera comprising a support for supporting an optical lens, the support integrally formed with the optical lens in such a manner that the support is arranged generally within a maximum diameter area of the optical lens and outside an effective area of the optical lens through which an imaging light flux is transmitted.

2. An imaging lens system for a camera according to claim 1, wherein the optical lens is a molded resin lens, and the support is integrally formed with the molded resin lens.

3. An imaging lens system for a camera comprising:
    a support member for movably supporting an optical lens;
    an engagement section engaged with the support member, integrally formed with the optical lens in such a manner that the engagement section is arranged generally within a maximum diameter area of the optical lens and outside an effective area of the optical lens through which an imaging light flux is transmitted.

4. An imaging lens system comprising:
    a lens having at least an area which transmits an imaging light flux; and
    a lens support formed at an edge of the lens in such a manner that the lens support is arranged outside an imaging light flux transmitting area and within a phantom circle in which the lens is inscribed.

5. An imaging lens system according to claim 4, wherein the lens is oval in shape.

6. An imaging lens system according to claim 4, wherein the lens is a partly circular-shaped lens with top and bottom arc portions cut out, and the lens support is mounted on a projection radially extended from an edge of the lens formed by one cutout of the lens.

7. An imaging lens system according to claim 6, wherein the lens support comprises at least one of a through-hole and a notch formed in the projection and shafts passing through the through-hole and the notch.

8. An imaging lens system according to claim 4, wherein the lens is a generally rectangular-shaped lens that is formed by cutting a circular lens to remove a top, bottom, left-hand side and right-hand side arc portions, and the lens support is mounted on a projection radially extended from an edge of the lens formed by one of the removed portions of the lens.

9. An imaging lens system according to claim 8, wherein the lens support comprises at least one of a through-hole and a notch formed in the projection and shafts passing through the through-hole and the notch.

10. An imaging lens system comprising:
    a circular lens having at least an area which transmits an imaging light flux; and
    a lens support formed at an edge of the lens in such a manner that the lens support is arranged outside the imaging light flux transmitting area and within an outer diameter of the lens.

11. An imaging lens system according to claim 10, wherein the lens is a composite lens comprising a resin lens and a glass lens smaller than and attached to the resin lens, and the lens support is arranged on the resin lens.

12. An imaging lens system according to claim 11, wherein the glass lens is a non-circular lens.

13. An imaging lens system according to claim 12, wherein the glass lens has a partly circular shape with top and bottom arc portions removed.

14. An imaging lens system comprising:
    a lens having at least an area which transmits an imaging flight flux; and
    a lens support formed at an edge of the lens, the lens support comprising a hollow sleeve secured in a through-hole and a notch, and a shaft passing through the through-hole and the notch, the through-hole and the notch being formed outside the imaging light flux transmitting area and within a phantom circle in which the lens is inscribed.

15. An imaging lens system according to claim 14, wherein the sleeve is rigidly bonded to the lens in such a manner that the sleeve is in parallel with an optical axis of the lens.

16. An imaging lens system comprising:

a circular lens having at least an area which transmits an imaging light flux; and a lens support formed at an edge of the lens, the lens support comprising a hollow sleeve secured in a through-hole and a notch, and a shaft passing through the through-hole and the notch, the through-hole and the notch being formed outside the imaging light flux transmitting area and within an outer diameter of the lens.

17. An optical imaging system comprising:

a first lens and a second lens, each having at least an area which transmits an imaging light flux;

a first lens support integrally formed with the first lens on an edge of the first lens in such a manner that the first lens support is arranged outside the imaging light flux transmitting area and within a phantom circle in which the first lens is inscribed;

a second lens support integrally formed with the second lens on an edge of the second lens in such a manner that the second lens support is arranged outside an imaging light flux transmitting area but within a phantom circle in which the second lens is inscribed; and a shaft connecting the first lens support to the second lens support, the shaft being rigidly attached to the first lens support and slidably supporting the second lens support enabling movement of the second lens in a direction of an optical axis.

18. An imaging lens system for a camera having a plurality of lenses independently movable comprising:

a plurality of lens supports for supporting the plurality of lenses, wherein at least the lens support of a first lens positioned closest to a film plane is integrally formed with the first lens, and arranged generally within a maximum diameter area of the first lens and outside an effective area of the first lens through which an imaging light flux is transmitted.

* * * * *